US011159642B2

(12) United States Patent
Galloni

(10) Patent No.: US 11,159,642 B2
(45) Date of Patent: Oct. 26, 2021

(54) SITE AND PAGE SPECIFIC RESOURCE PRIORITIZATION

(71) Applicant: CLOUDFLARE, INC., San Francisco, CA (US)

(72) Inventor: Andrew Galloni, Tonbridge (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 16/517,484

(22) Filed: Jul. 19, 2019

(65) Prior Publication Data

US 2021/0021691 A1    Jan. 21, 2021

(51) Int. Cl.
*H04L 29/08* (2006.01)
(52) U.S. Cl.
CPC .......... *H04L 67/322* (2013.01); *H04L 67/025* (2013.01); *H04L 67/2842* (2013.01); *H04L 67/34* (2013.01)
(58) Field of Classification Search
CPC ..... H04L 67/322; H04L 67/34; H04L 67/025; H04L 67/2842; H04L 67/2847; G06F 16/957; G06F 16/9577; G06F 16/958
See application file for complete search history.

(56) References Cited

U.S. PATENT DOCUMENTS

| 5,826,031 | A | 10/1998 | Nielsen | |
|---|---|---|---|---|
| 8,943,236 | B1 * | 1/2015 | Usmani | G06F 13/36 710/20 |
| 9,307,004 | B1 * | 4/2016 | Hayden | H04L 67/2838 |
| 9,734,134 | B1 * | 8/2017 | Boynes | G06Q 30/0641 |
| 10,013,500 | B1 * | 7/2018 | McClintock | G06F 16/9535 |
| 10,587,674 | B1 * | 3/2020 | Hansen | H04L 45/00 |

(Continued)

FOREIGN PATENT DOCUMENTS

WO    WO-2016122662 A1 *  8/2016    ....... G06F 15/17331

OTHER PUBLICATIONS

Weiss, et al., "Get Ready for Priority Hints," Google Developers, Feb. 2019, last updated May 29, 2019, downloaded from https://developers.google.com/web/updates/2019/02/priority-hints on Jul. 19, 2019, 11 pages.

*Primary Examiner* — Aaron N Strange
(74) *Attorney, Agent, or Firm* — Nicholson, De Vos, Webster & Elliott, LLP

(57) ABSTRACT

A process for prioritizing content responses executed by a first server in a distributed cloud platform. The first server including processor, and a non-transitory machine-readable storage medium that provides instructions that, when executed by the processor, causes the first server to perform operations including to receive a request for a plurality of content items from a client device, where the proxy server is in a distributed cloud computing platform, receive a first content item of the plurality of content items from an origin server or a cache, determine a priority scheme for ordering the plurality of content items, where the priority scheme is specific to the plurality of content items and is derived from analysis of a first content item from the plurality of content items, and send a response including the plurality of content items to the client device in an order according to the determined priority scheme.

18 Claims, 10 Drawing Sheets

(56) References Cited

U.S. PATENT DOCUMENTS

| | | | |
|---|---|---|---|
| 2003/0145088 A1* | 7/2003 | Bhogal | H04L 29/06 709/226 |
| 2006/0165103 A1* | 7/2006 | Trudeau | H04L 12/2854 370/401 |
| 2010/0125852 A1* | 5/2010 | Grant | G06F 8/71 719/311 |
| 2012/0159311 A1* | 6/2012 | Hanssen | G06F 16/9577 715/243 |
| 2014/0189054 A1 | 7/2014 | Snider et al. | |
| 2014/0365865 A1* | 12/2014 | Ivory | G06F 40/14 715/234 |
| 2015/0350370 A1* | 12/2015 | Lepeska | H04L 67/2847 709/219 |
| 2016/0261714 A1* | 9/2016 | Yang | G06F 16/957 |
| 2019/0056917 A1* | 2/2019 | Bernal | G06F 16/958 |
| 2020/0012695 A1* | 1/2020 | Esquivel | H04L 67/02 |
| 2020/0125683 A1* | 4/2020 | Hajduczenia | G06F 3/04842 |
| 2020/0159866 A1* | 5/2020 | Dong | G06F 40/151 |

\* cited by examiner

SITE AND PAGE SPECIFIC RESOURCE PRIORITIZATION

FIELD

Embodiments of the invention relate to the field of network computing; and more specifically, to a proxy server that reprioritizes streaming a resource to at least one requesting client device while the resource is being received at the proxy server.

BACKGROUND

Web browsers and similar client applications that run at client devices access network resources by making hypertext transfer protocol (HTTP) requests. The HTTP requests are directed to an origin server, which generates responses to the requests. With SPDY (by Google, Inc.), HTTP/2 and Quick user datagram protocol (UPD) Internet Connections (QUIC) web request protocols, the client applications make requests of network resources provided by the origin server and specify how the responses should be delivered (in what order and how to split bandwidth between them). However, the specified prioritization of the responses varies by the client application. The specified prioritization of the client applications is not consistent and is not based on any information about the requested network resources that enables the prioritization to be an optimal user experience or use of bandwidth.

The prioritization of requested content items that make up a network resource must be supported at the origin server to be implemented. Generally, the origin servers that support the SPDY, HTTP/2 and QUIC prioritization protocols attempt to honor the prioritization (e.g., in terms of dependencies and weights) that the client applications specify. Good prioritization is critical to the user experience, particularly on slower connections where the difference between good and bad prioritization can be tens of seconds to minutes of a blank screen before seeing the requested content load. However, many client applications like web browsers have poorly constructed prioritization schemes or lack any support for prioritization. Those client applications that do support prioritization provide a generic prioritization strategy that will not be optimal for all applications, requested resources, and network conditions.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A method and apparatus for a proxy server to determine a new priority scheme to reprioritize content items of a network resource returned in a set of responses to a set of requests from a client device for the network server where the new priority scheme can be site or page specific. The proxy server receives a request for a network device (e.g., a web page) from a first client device. The request may be, for an example, an HTTP/S request for a web page, web application or similar network resource. For instance, the requested network resource could be a web page with scripts, images, audio and similar related files. The proxy server determines whether the network resource is fully available in a local cache that is available to the proxy server. Where the network resource is not fully available in the local cache, the proxy server transmits a set of requests for the network resource to another server (e.g., the origin server) and begins receiving the content items associated with the network resource. While the network resource is being received, the proxy server sends responses to the requesting client device without waiting for all of the content items of the network resource to be fully received at the proxy server. In one embodiment, the proxy server can analyze the responses as they are received to identify content items that may be of a higher priority than other content items. In another embodiment, code can be inserted into some of the responses to similarly analyze the content items at the client device to determine higher priority content items and report this information back to the proxy server. In each embodiment, a new priority scheme is determined based on collected analysis of the content items in the responses. The new priority scheme can be applied at the proxy server to alter the order (i.e., re-prioritize) the content items being sent to the requesting client device. Thus, the proxy server can implement a new prioritization scheme that is site or page specific that improves the throughput and responsiveness between the proxy server and the client device for key content items to reduce their load times and improve user experience.

Figure 1A:
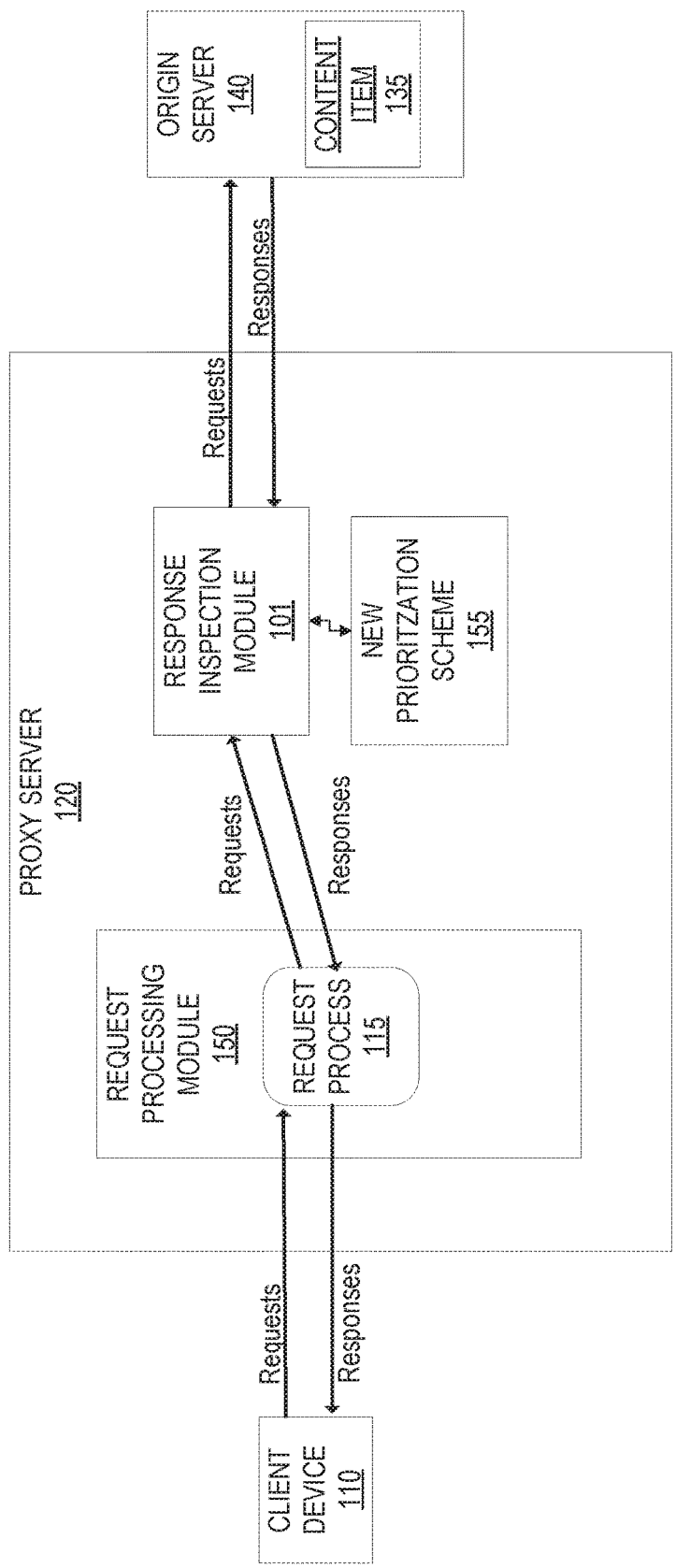
FIG. 1A is a diagram that illustrates exemplary operations for a proxy server receiving a set of requests for a network resource and the constituent content items and the determination of a reprioritization scheme for the responses with the requested content items according to an embodiment using response inspection.

FIG. 1A is a diagram that illustrates exemplary operations for a proxy server that provides a response inspection module to determine a new priority scheme for the order of content item responses for client devices while the resource is being received at the proxy server according to an embodiment. The diagram includes a client device 110 that is communicatively connected to the proxy server 120. Each client device 110 is a computing device (e.g., laptop, workstation, smartphone, mobile phone, tablet, gaming system, set top box, wearable device, Internet of Things (IoT) device, etc.) that is capable of transmitting and/or receiving network traffic. Each client device may execute a client network application such as a web browser, native application, or other application that can access network resources (e.g., web pages) that are associated with or include a set of content items (e.g., images, word processing documents, PDF files, movie files, music files, or other computer files). In the example embodiment of FIG. 1, a single client device and proxy server are illustrated for sake of clarity and conciseness. However, one skilled in the art would understand that a proxy server can service any number of client devices and that any number of proxy servers may be present in a network such that requests can be distributed the proxy servers to spread the load of serving the requests.

The proxy server 120 is a physical server that is configured to retrieve a network resource for requesting client devices as will be described in greater detail herein. The proxy server 120 has a multi-processor architecture where each request may be handled by a different process and/or potentially on a different processor. The proxy server 120 includes a request processing module 150 that includes a set of request process 115. A 'set,' as used herein refers to any whole number of items including one item. The request processing module 150 may be acting as a reverse proxy web server with caching. Each request process 115 processes one or more requests. The request process 115 may be executed on any processor or core available to the proxy server. Although a single request processes is illustrated, there may be more request processes being executed on the proxy server 120. Each request process 115 can process multiple requests concurrently. The proxy server 120 can also include a memory structure that can be a shared memory that is available to each of the request processes 115. The memory structure includes non-transitory computer readable media for storing data and instructions. In some embodiments, the memory structure can include a cache for content items and related data about the cached content items. The cache can be utilized to store previously retrieved content items such that the request processing module does not have to request these content items from an origin server 140 on subsequent requests from client devices. The cache is communicatively available to the proxy server. The cache can be included within the proxy server 120 or may be physically separate from the proxy server. If physically separate, the cache is available to the proxy server 120 and is typically part of the same colocation site. That is, it is generally faster to retrieve files from the cache instead of from the origin server 140.

Although not illustrated in FIG. 1A, the proxy server 120 may be part of a distributed cloud computing network that includes multiple proxy servers that are geographically distributed. The proxy servers may be in different points-of-presences (PoPs). Each PoP may include one or more physical servers (e.g., one or more proxy servers, one or more control servers, one or more domain name service (DNS) servers (e.g., one or more authoritative name servers, one or more proxy DNS servers), and one or more other pieces of network equipment such as router(s), switch(es), and/or hub(s)). Each PoP may be part of a different data center and/or colocation site. The distributed cloud computing network may provide different services for customers (e.g., domain owners or operators) such as protecting against internet-based threats, performance services (e.g., acting as a content delivery network (CDN) and dynamically caching customer's files closer to visitors, page acceleration/optimization), TCP stack optimizations, and/or other services. Although not illustrated in FIG. 1A, there are other physical devices between the proxy server 120 and the client devices such as routers, switches, and similar network and computing devices. These additional devices have been omitted for sake of clarity and conciseness.

The origin server 140, which may be owned or operated directly or indirectly by a third-party to the distributed cloud computing network, is a computing device on which a network resource resides and/or originates (e.g., web pages) that has an associated set of content items 135) (e.g., images, word processing documents, PDF files movie files, music files, or other computer files). The origin server 140 can service requests for these content items. The content items may be associated with a domain, where the domain is a network of commonly administered computers or devices typically having an associated domain name. The origin server 140 can service multiple domains. The origin server 140 can be any type of computing device (e.g., server, cloud computing platform or similar computing devices) and have any type of data storage system to store the content items.

The proxy server 120 may operate as a reverse proxy and receive requests for network resources (e.g., HTTP requests) of a domain of the origin server 140. In an embodiment where the proxy server 120 is one of multiple proxy servers that are part of a distributed cloud computing network, the proxy server 120 may receive a request from a particular client device 110 as determined by the network infrastructure according to an Anycast implementation or by a geographical load balancer. For instance, each of the proxy servers 120 may have a same anycast IP address for a domain of the origin server 140. If the origin server 140 handles the domain "example.com," a domain name service (DNS) request for "example.com" returns an address record having the anycast Internet Protocol (IP) address of the proxy servers. Which one of the proxy servers 120 receives and handles a request from a client device 110 depends on which proxy server 120 is closest to the client device 110 in terms of routing protocol configuration (e.g., Border Gateway Protocol (BGP) configuration) according to an anycast implementation as determined by the network infrastructure (e.g., router(s), switch(es), and/or other network equipment between the requesting client device 110 and the proxy servers 120). In some embodiments, instead of using an anycast mechanism, a geographical load balancer is used to route traffic to the nearest proxy server.

In an embodiment, the proxy server 120 receives a request for a network resource of a domain of the origin server 140 because the DNS record(s) for that domain are changed such that DNS records of hostnames of the domain point to an IP address of the proxy server 120 instead of the origin server 140. In some embodiments, the authoritative name server of the third-party domain is changed to an authoritative name server of the distributed cloud computing network and/or individual DNS records are changed to point to the proxy server 120 (or point to other domain(s) that point to the proxy server 120). For example, the domain owners may change their DNS records to point to a CNAME record that points to the proxy server 120.

In one embodiment, the proxy server 120 executes a response inspection module 101 that generates a new prioritization scheme 155. As the request processing module 150 sends requests and receives responses from an origin server or cache, the response inspection module 101 can inspect and analyze the content of the returned content items. In particular, where a network resource is requested often a first returned response is a page or similar content item that identifies additional content items are subsequently requested by the client device 110. The response inspection module can scan the hypertext markup language (HTML) of the pages as they are returned to learn what content items are high priority and which content items are lower priority so when the subsequent requests for these content items arrive they can be prioritized accordingly. The response inspection module can search the content items for any type of information about the associated content items. For example, content items such as scripts and stylesheets identified early in the HTML can be assessed as higher priority than content items such as scripts, stylesheets, and images late in the HTML page. 'Early' can be 'in the head' of a page or similar document, may be before a critical page content item is identified, or can be similarly assessed in contrast to 'late,' which is after the 'early' identification. In some embodiments, content items can be explicitly marked or tagged with "[priority hints]. These explicit priority hints can be used to adjust the priority of content items as defined or can be given any level of weight in the priority scheme, independent of browser support for priority hints. Images or similar content close to the header information, as marked by header tags (e.g., <h1>(or other header tags)), can be assessed to be higher priority content items. Common image carousels, product listing images, and similar content items and page structures can be identified by class naming or patterns so that initially visible images or content items are assessed to be higher priority and initially hidden images and content items are then de-prioritized. The response inspection module 101 can identify common content management system (CMS) and E-Commerce platform content. This CMS and E-Commerce content can be identified and can have custom logic and detection mechanisms provided by the respective systems or platform developers to identify the core content items associated with the pages using these solutions and increase its priority. The identified content items and their relative priority can be stored or tracked as a new prioritization scheme 155 by the response inspection module 101. The new prioritization scheme 155 can be stored as a per site or page prioritization scheme to be applied to subsequent requests for associated content items from a client device. The new prioritization scheme 155 can be applied to the subsequent requests from the same client device 110 that follow on the initial request for the network resource from the origin server 140. In other embodiments, the new prioritization scheme 155 can be applied to subsequent requests from any client device 110 for the same network resource and associated content items 135 from the origin server 140.

Figure 1B:
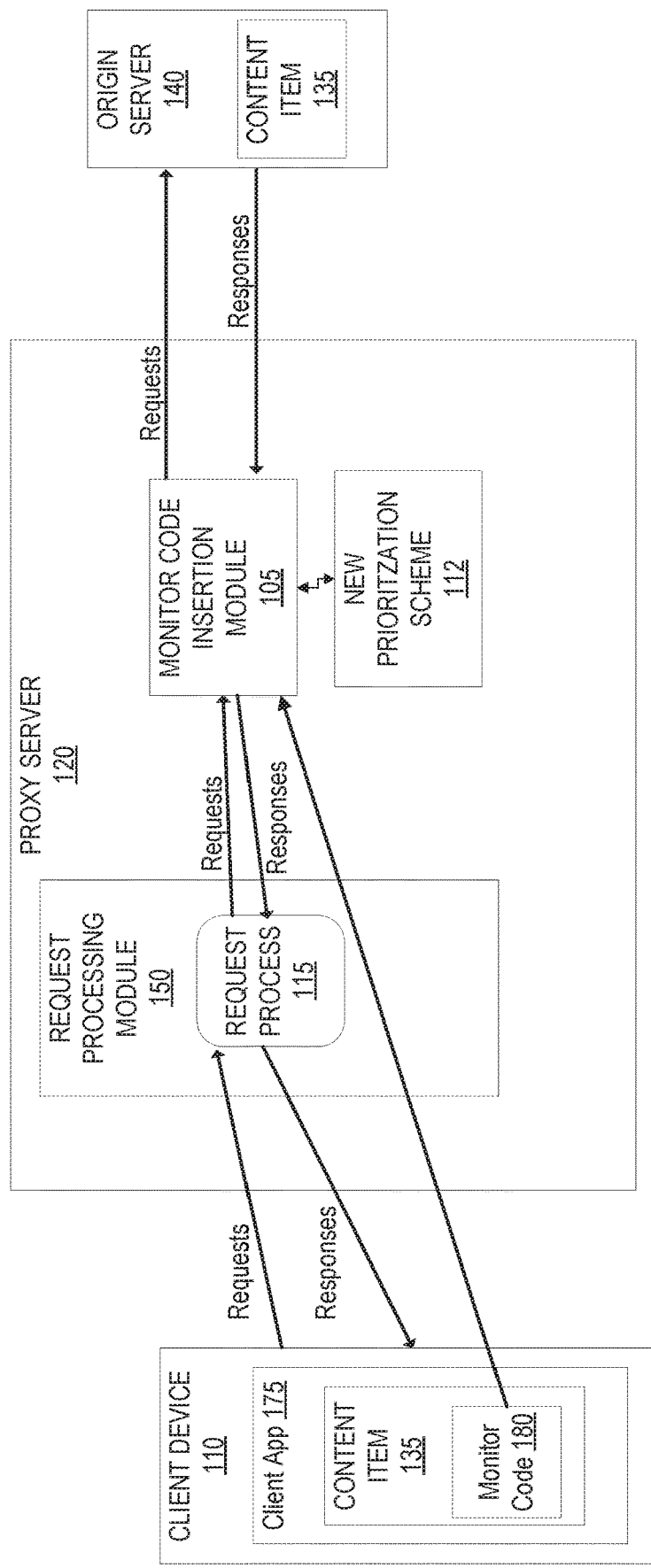
FIG. 1B is a diagram that illustrates exemplary operations for a proxy server receiving a set of requests for a network resource and the constituent content items and the determination of a reprioritization scheme for the responses with the requested content items according to another embodiment utilizing monitoring code insertion.

FIG. 1B is a diagram that illustrates exemplary operations for a proxy server that provides a monitor code insertion module to determine a new priority scheme for the order of content item responses for client devices while the resource is being received at the proxy server according to an embodiment. This embodiment is an alternative to the embodiment of FIG. 1A. In this embodiment, the client device 110 also sends a request for a network resource to the origin server 140 that is processed by the proxy server 120 in particular by the request processing module 150 and request processes 115 as is described herein above with relation to FIG. 1A. In this embodiment, the monitor code insertion module 105 analyzes responses from the origin server 140 and can identify pages and similar content items 135 in which a monitor code 180 can be inserted. The monitor code 180 implements an analysis similar to that which is performed by the response inspection module in the preceding embodiment described herein above. The monitor code 180 can be a script that is added or inserted to the initially requested and returned content items 135 where the client application 175 can execute the script 180 causing it to collect information about the content item 135, user interaction with the client application 175 related to the content item 135, and similar information about actual usage of the content item 135 by the client application 175 in addition to the analysis about relative content item identification location (e.g., in or near a header section or later), priority hints, visible or hidden content item state and similar priority indications that can be identified in a page or similar document. The information collected by the monitor code 180 can be reported back to the monitor code insertion module 105, which can be utilized in the generation of the new prioritization scheme 112. In some embodiments, the analysis of the responses to the client device request can be divided between the monitor code 180 and the monitory code insertion module 105 in any combination to efficiently generate the new prioritization scheme 112.

The new prioritization scheme 112 can be stored as a per site or page prioritization scheme to be applied to subsequent requests for associated content items from a client device. The new prioritization scheme 112 can be applied to the subsequent requests from the same client device 110 that follow on the initial request for the network resource from the origin server 140. In other embodiments, the new prioritization scheme 112 can be applied to subsequent requests from any client device 110 for the same network resource and associated content items 135 from the origin server 140.

Figure 1C:
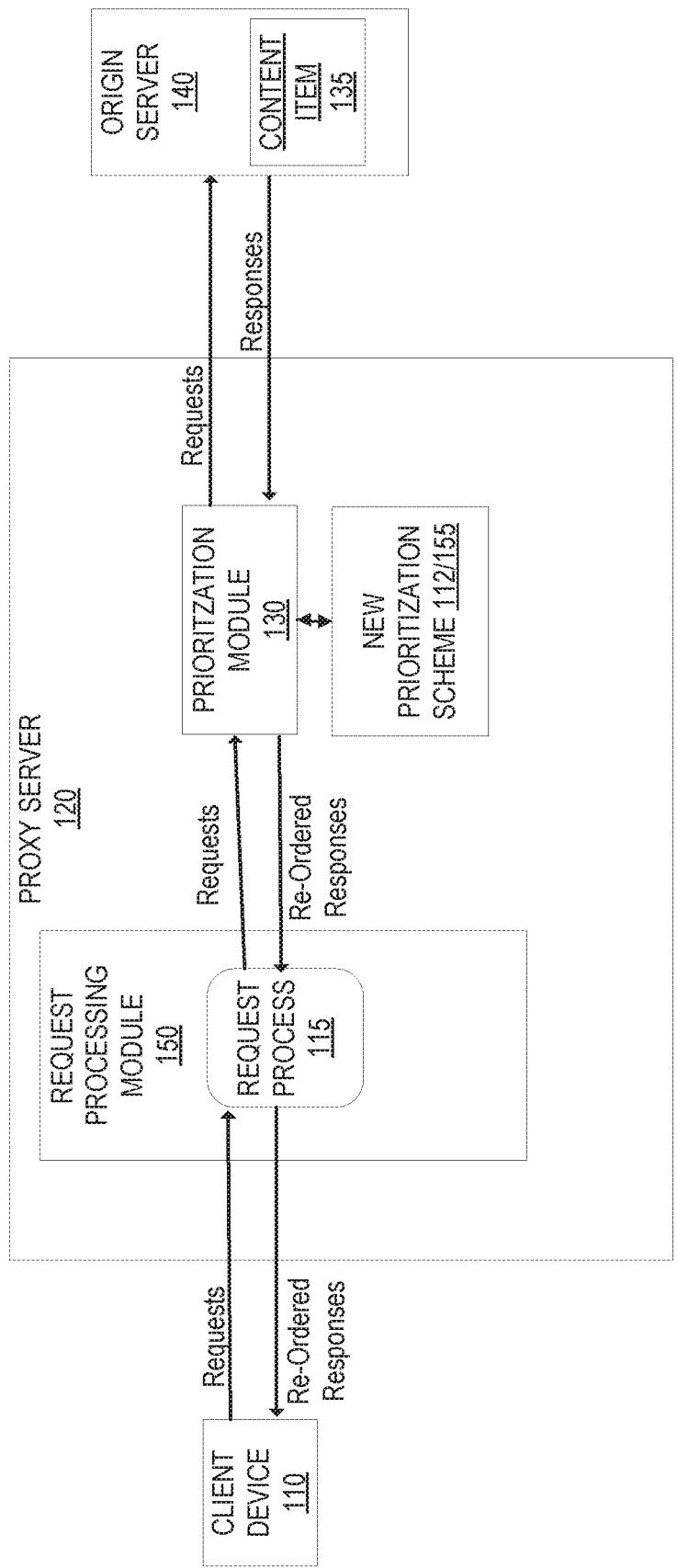
FIG. 1C is a diagram that illustrates exemplary operations for a proxy server receiving a set of requests for a network resource and the constituent content items and the application of a new prioritization scheme to reprioritize the responses with the requested content items according to one embodiment.

FIG. 1C is a diagram that illustrates exemplary operations for a proxy server that provides a prioritization module 130 to implement a new priority scheme to reprioritize the order of content item responses for client devices while the resource is being received at the proxy server according to an embodiment. The prioritization module 130 is implemented at the proxy server 120 to alter the default order that content items are returned to the client device (e.g., the default order being specified by the client device by the order of the requests or by the origin server in the order of the responses). The prioritization module 130 can implement the new prioritization scheme 112/155 as determined by any embodiment including the response inspection module 101 or the monitory code insertion module 105 as described herein above. The prioritization module 130 can implement the priority scheme 130 by altering the forwarding of requests and responses between the client device 110 and origin server 140 according to the priority of content items 135 as specified by the new prioritization scheme 112/155. The prioritization module 135 upon detecting a request from a client device 110 can check a local cache or similar storage structure to determine whether a new prioritization scheme 112/155 exists for a requested network resource or set of content items 135. This check can be remade with each request received from client devices 110 as the prioritization module can operate asynchronously with relation to the modules that generate the new prioritization schemes 112/155 (e.g., the response inspection module 101, monitor code insertion module 105, or similar modules). The prioritization module 130 can operate continuously at the proxy server 120 in response to requests from a client 110. The prioritization module 130 can also operate where any of the content items 135 are locally cached or retrieved from sources other than the origin server.

Figure 2A:
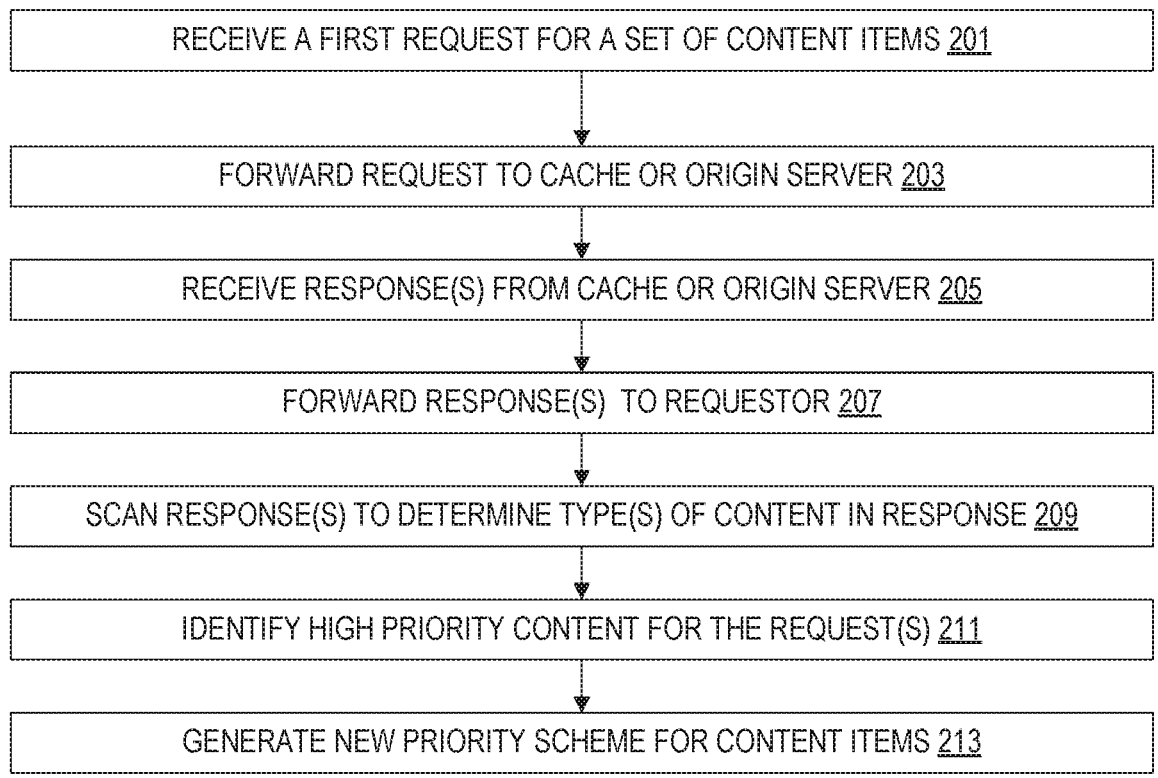
FIG. 2A is a flow diagram that illustrates exemplary operations for a proxy server handling a request from a client device and determining a new prioritization scheme for the content items by analyzing responses to the request from the origin server according to an embodiment.

FIG. 2A is a flowchart illustrating a process for determining a new prioritization scheme for responses to network resource requests based on analysis of responses to the network resource request in one embodiment. At operation 201, the proxy server receives a request for a network resource associated with a set of content items. For example, referencing FIG. 1A, the proxy server 120 receives a request for a content item 135 of a domain of the origin server 140 from the client device 110. For instance, the request may be an HTTP/S GET request. In the example of FIG. 1A, the request is for a network resource that includes the content item 135. The requested content item can be any type of content item (e.g., images, audio, applications or similar content items). The request is processed by a first request process 115 of the proxy server 120. For example, the request from the client device 110 is processed by the request process 115. In an embodiment, the proxy server 120 receives the request because a DNS request for the hostname returns an IP address of the proxy server 120 instead of the origin server 140.

Next, at operation 203, the request process or similar process of the proxy server 120 determines whether the content item 135 is available in a local or network accessible cache. If the content item is not available in the cache, the proxy server 120 transmits a request for the file to the origin server 140. This request may be an HTTP/S GET request and be similar to the request received in operation 201. In the example of FIG. 1A, this request is for the content item 135. Although FIG. 1A shows the proxy server 120 transmitting the request for the content item to the origin server 140, in another embodiment the proxy server 120 transmits the request for the file to a different server (e.g., a different proxy server that may have the file cached). In some embodiments, the response inspection module can also track or play a role in forwarding the request to the origin server 140 or in retrieving the content items 135 from local or network caches (e.g., from other proxy servers in the network).

At operation 205, the proxy server 120 receives a response from the origin server 140 or is able to retrieve the content item from the local cache or similar location. The amount of time necessary to receive the content item 135 from the origin server 140 depends, in part, on the size of the content item 135 and the available transmission bandwidth. At operation 207, as the content item is being received from the origin server 140 or from the cache, the proxy server 120 can generate a response and forward the content item to the client device 110.

In parallel or after the content item is forwarded to the requesting client device, at operation 209, the response inspection module 101 scans the returned content item and any related content items that are part of a response for a network resource to determine the content-type of the content item. If the content item includes information about other content items that are likely to be requested, then the information can be analyzed for prioritizing subsequent requests for content items related to the network resource. For example, if the requested network resource was a web page, then the retrieved content items can include the HTML file of the web page, images of the web page, and similar content items. Often, the HTM file is first returned in response to a request from the client device and the client device processes the HTML file to generate additional requests for content items specified in the HTML file. The response inspection module 101 identifies the HTML file and scans the HTML file to identify other content items therein.

At operation 211, the response inspection module can identify content items in the response that are high (and low) priority. The response inspection module can search the content items for any type of information about other associated content items. Information about other content items can be assessed to indicate priority information based on the location within the HTML file or similar type of file. As mentioned, content items such as scripts and stylesheets identified early in the HTML file can be assessed as higher priority than content items such as scripts, stylesheets, and images identified later in the HTML page. The scan can locate explicit priority information such as priority hints. These explicit priority hints can also be used to adjust the priority of content items as defined by the priority hint or the priority hint can be given any level of weight in the priority scheme, independent of browser support for priority hints. The scan can also identify content items that are initially visible or hidden to a user of a client device where visible content items are then prioritized over hidden content items. Similarly, the scan can identify well known or common content items or data structures that can have predefined priorities assigned to them.

At operation 213, the identified content items and their relative priority can be stored or tracked as a new prioritization scheme by the response inspection module 101 in a data structure that is accessible to the proxy server. For example, the new prioritization scheme can be stored in a local memory, cache or database system. A prioritization module can then apply the new prioritization scheme to subsequent requests for content items associated with a network resource by indexing or similarly associating the network resource with the new prioritization scheme to enable a lookup by the prioritization module in response to further requests for the network resource and associated content items.

The new prioritization scheme can be updated in some embodiments in response to further requests for a network resource or in response to determining that the network resource has changed since the last time that the network resource or any of its constituent items have been accessed. The application of the new prioritization scheme is discussed herein below with reference to FIG. 3, which describes one example process for the operation of a prioritization module.

Figure 2B:
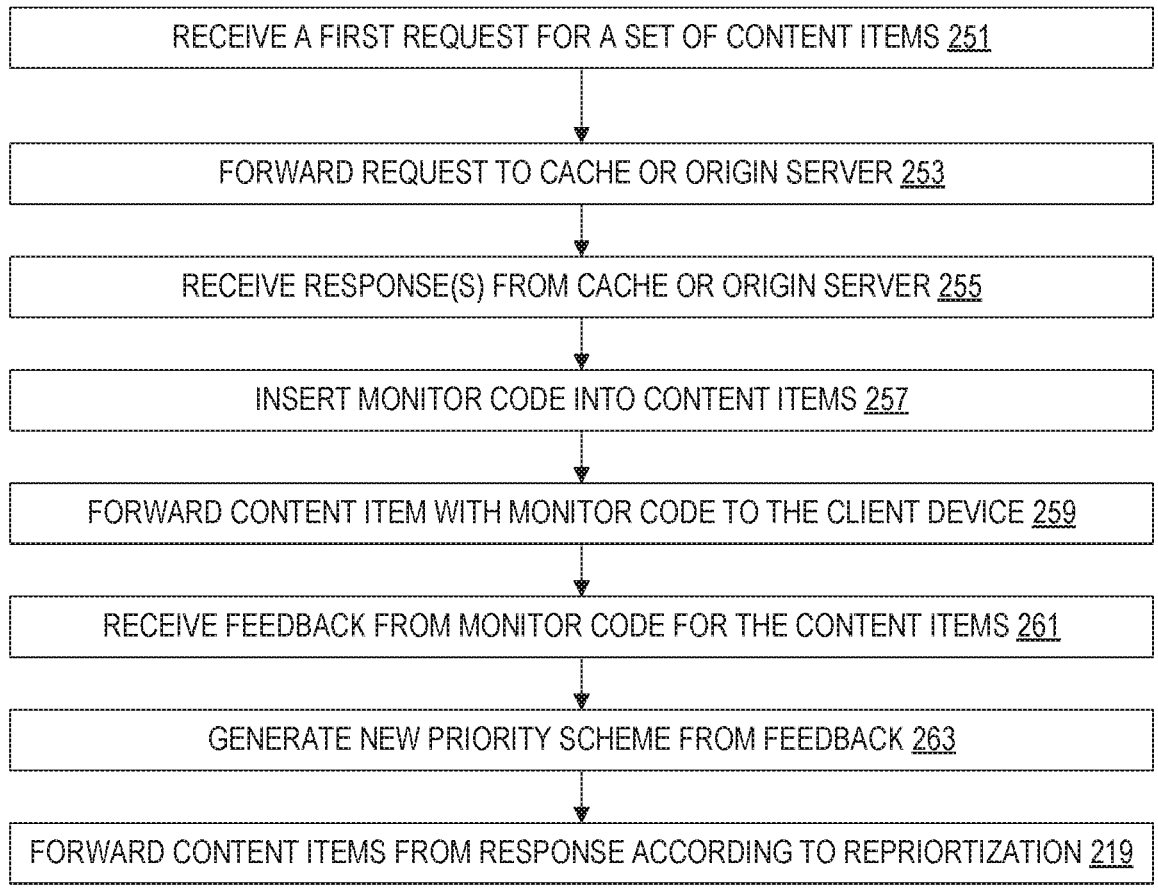
FIG. 2B is a flow diagram that illustrates exemplary operations for a proxy server handling a request from a client device and determining a new prioritization scheme for the content items by analyzing feedback from code inserted to the response from the origin server according to an embodiment.

FIG. 2B is a flowchart illustrating another process for determining a new prioritization scheme for responses to network resource requests based on analysis of responses to the network resource request provided by monitor code that is inserted into the response in one embodiment. At operation 251, the proxy server receives a request for a network resource associated with a set of content items. For example, referencing FIG. 1B, the proxy server 120 receives a request for a content item 135 of a domain of the origin server 140 from the client device 110. For instance, the request may be an HTTP/S GET request. In the example of FIG. 1B, the request is for a network resource that includes the content item 135. The requested content item can be any type of content item (e.g., images, audio, applications or similar content items). The request is processed by a first request process 115 of the proxy server 120. For example, the request from the client device 110 is processed by the request process 115. In an embodiment, the proxy server 120 receives the request because a DNS request for the hostname returns an IP address of the proxy server 120 instead of the origin server 140.

Next, at operation 253, the request process or similar process of the proxy server 120 determines whether the content item 135 is available in a local or network accessible cache. If the content item is not available in the cache, the proxy server 120 transmits a request for the file to the origin server 140. This request may be an HTTP/S GET request and be similar to the request received in operation 251. In the example of FIG. 1B, this request is for the content item 135. Although FIG. 1B shows the proxy server 120 transmitting the request for the content item to the origin server 140, in another embodiment the proxy server 120 transmits the request for the file to a different server (e.g., a different proxy server that may have the file cached). In some embodiments, the monitor code insertion module 105 can also track or play a role in forwarding the request to the origin server 140 or in retrieving the content items 135 from local or network caches (e.g., from other proxy servers in the network).

At operation 255, the proxy server 120 receives a response from the origin server 140 or is able to retrieve the content item from the local cache or similar location. The amount of time necessary to receive the content item 135 from the origin server 140 depends, in part, on the size of the content item 135 and the available transmission bandwidth. At operation 257, as the content item is being received from the origin server 140 or from the cache, the proxy server 120 can generate a response, insert monitor code, into the content item 135 and forward the content item to the client device 110.

The monitor code insertion module 105 scans the returned content item and any related content items that are part of a response for a network resource to determine the content-type of the content item. If the content item includes information about other content item is an HTML file, script or similar file that is to be executed or interpreted by the client device, then the monitor code insertion module can perform the monitor code insertion. If the content item is an image, audio, or similar data that is not executed or interpreted by the client device, then the monitor code insertion module can pass the content item on to the client device in a response without inserting monitoring code.

At operation 259, the content item with the inserted monitor code is forwarded to the client device 110. The client device 110 executes or interprets the content item with the inserted monitor code and the monitor code starts to analyze the content item, client device usage of the content item, user interaction with the content item and similar information. Where the content item is executed or interpreted by a client application (e.g., a web browser), the monitor code can collect information about the client application. For example, if the requested network resource was a web page, then the retrieved content items can include the HTML file of the web page, images of the web page, and similar content items. Often, the HTML file is first returned in response to a request from the client device. The monitor code can be inserted into the HTML file and the client device processes the HTML file to generate additional requests for content items specified in the HTML file, which are tracked by the monitor code in addition to the use, display, user interaction and similar information about the additional requests.

The monitor code can identify content items in the web page and related responses that are high (and low) priority. The monitor code can search the content items for any type of information about other associated content items. Information about other content items can be assessed to indicate priority information based on the location within the HTML file or similar type of file. As mentioned, content items such as scripts and stylesheets identified early in the HTML file can be assessed as higher priority than content items such as scripts, stylesheets, and images identified later in the HTML page. The scan can locate explicit priority information such as priority hints. These explicit priority hints can also be used to adjust the priority of content items as defined by the priority hint or the priority hint can be given any level of weight in the priority scheme, independent of browser support for priority hints. The scan can also identify content items that are initially visible or hidden to a user of a client device where visible content items are then prioritized over hidden content items. Similarly, the scan can identify well known or common content items or data structures that can have predefined priorities assigned to them. In addition, the monitor code can detect client device usage, rendering, user access, and similar client side actions indicating the relative importance and priority of the content items. This information is reported back to the monitor code insertion module 105.

At operation 261, the monitor code insertion module can receive the feedback from the client side monitor code. This feedback can be combined with any information determined by the monitor code insertion module 105 to determine the relative priority of content items associated with a network resource. At operation 263, the monitor code insertion module can generate the new prioritization scheme for the network resource. The new prioritization scheme can be stored or tracked by the monitor code insertion module 105 in a data structure that is accessible to the proxy server. For example, the new prioritization scheme can be stored in a local memory, cache or database system. A prioritization module can then apply the new prioritization scheme to subsequent requests for content items associated with a network resource by indexing or similarly associating the network resource with the new prioritization scheme to enable a lookup by the prioritization module in response to further requests for the network resource and associated content items.

The new prioritization scheme can be updated in some embodiments in response to further requests for a network resource, additional feedback collected by the monitor code, or in response to determining that the network resource has changed since the last time that the network resource or any of its constituent items have been accessed. The application of the new prioritization scheme is discussed herein below with reference to FIG. 3, which describes one example process for the operation of a prioritization module.

Figure 3:
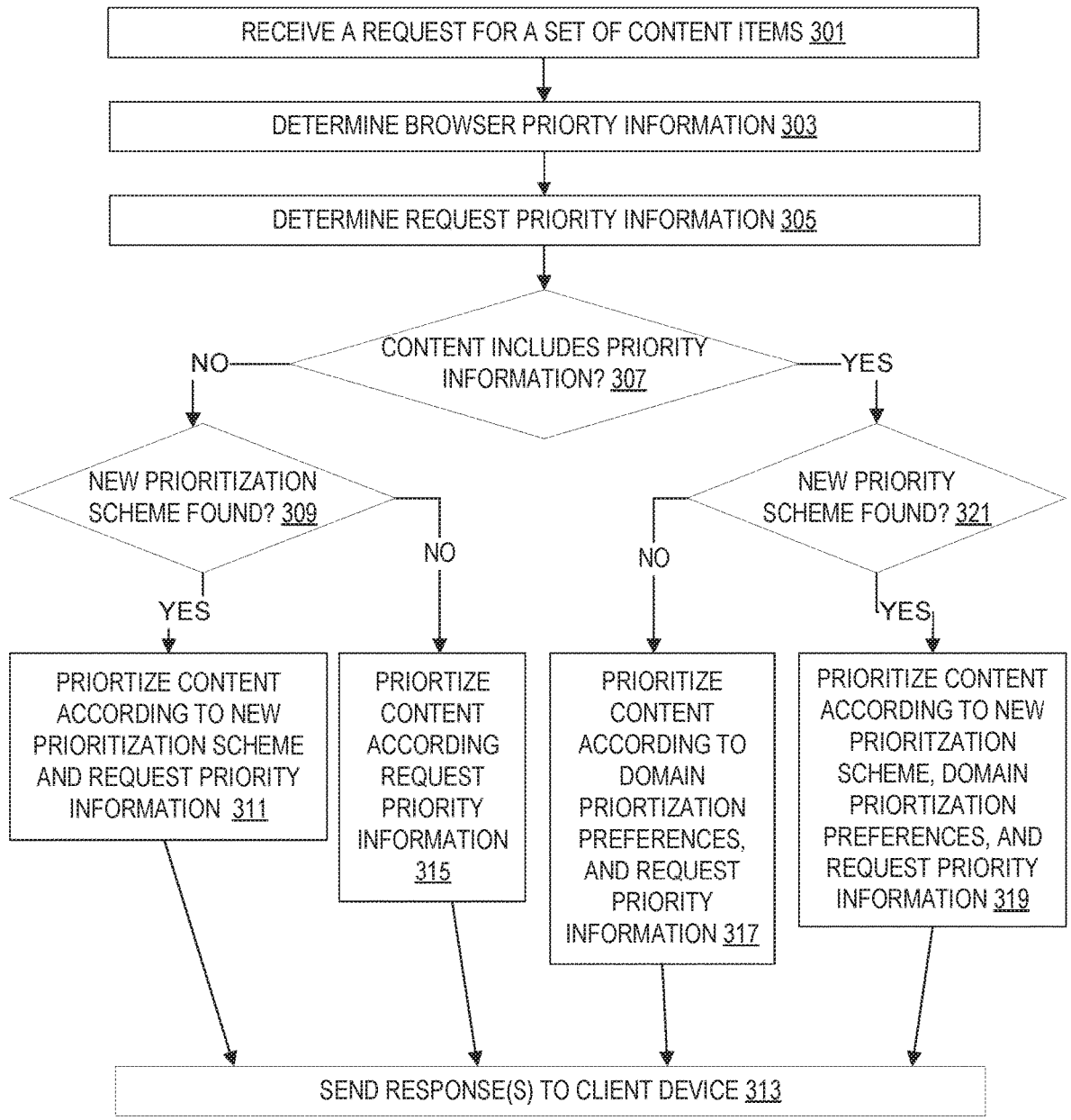
FIG. 3 is a flow diagram that illustrates exemplary operations for prioritizing content items for a response to the client device.

FIG. 3 is a flow diagram that illustrates exemplary operations of a prioritization module for a proxy server to re-order the content items to requesting client devices according to an embodiment. The operations of FIG. 3 will be described with respect to HTTP/S request and responses. But, the operations of FIG. 3 can be performed with different types of requests and responses such as QUIC requests and response. The prioritization module at the proxy server determines an order or priority of the content items to be returned to the client device. The operation of the prioritization module to determine the order of the content items is also discussed further herein below with reference to FIGS. 4-6. The prioritization module can re-order the content items retrieved from the cache and the origin server from a default order that can be set by the client device (e.g., a browser can request a specific prioritization), the origin server, or the default configuration of the requested network resource. The prioritization module can re-order the individual bytes of the content items in addition to the content items as a whole. For example, multiple images can be interleaved or higher priority content items or portions thereof can be inserted into a response stream during transmission of lower priority content items.

As set forth above, the request processing module and request process forward the content items from responses to the client device as a set of re-ordered responses according to the new prioritization scheme as implemented by the prioritization module. The prioritization module can thereby improve the speed and quality of the user experience in accessing the requested network resource as further discussed herein below. The new prioritization scheme can be based solely on the analysis of the response inspection module, monitor code insertion module or similar components. In other embodiments, the new prioritization scheme can encompass or be combined with prioritization information from the client application, the origin server, and similar sources.

In an embodiment, the first server referred to in FIG. 3 is the proxy server 120 and the second server referred to in FIG. 3 is the origin server 140. The process of FIG. 3 is implemented by the prioritization module in response to a network resource request (e.g., a request for a domain resource) that includes handling the request for a set of content items and a set of responses to these requests from a client device. At operation 301, a first server receives a first request for a file from a first client device. The requested file may be relatively large (e.g., greater than 500 MB). The request may be an HTTP/S request. The request is for a file of a domain handled by a second server (e.g., an origin server). That is, the file does not originate from the first server.

At operation 303, the prioritization module determines the priority information of the browser or similar client device-based prioritization information. Browser implementations of HTTP/2, QUIC and similar prioritization vary significantly and even in the best cases are still not optimal. HTTP/2 and QUIC do not enforce browser prioritization in any way and thus the browser prioritization can be treated as a suggestion from the client device on content item delivery order. Delivering content items in an optimal order can have a significant impact on the user experience such as the performance of browser loading a page, the time required for a browser to render a page, or the time for the browser to enable interactive features of the page. Making the prioritization programmable on the server-side provides significant benefits. Browsers with poor prioritization schemes can have their prioritization over-ridden and content items can be delivered in an optimal order even with no client support. Browsers with good or reasonable prioritization schemes but with gaps or issues can be improved (e.g., allowing for images to download concurrently where the browser fails to enable this behavior). Cases where a specific application is not optimal with a "default" prioritization scheme can be improved on an application-by-application basis.

At operation 305, the prioritization module determines the prioritization information of a specific client device request. This can include the prioritization information specified in the request itself that may be based on request protocol or similar factors. As the content items are returned by the cache or origin server, the prioritization module can examine the content items to determine if they include information related to prioritization, at operation 307. The content items can include information about their type or similar information that is collected to assist in the re-ordering of the content items for delivery to the client device. In addition, a domain of the content items can include specific prioritization scheme information where the domain attempts to manage the prioritization of the responses for the content items.

At operation 309, if there was not any priority information from the domain of the content items handled be the origin server, then the prioritization module checks to determine whether a new prioritization scheme has been generated for the domain of the content items, the content items specifically, the network resource, or similar set of elements. The prioritization scheme can be looked up in a local data structure, based on identifiers, hashes, or similar keys based on the requested network resource or content items. If the prioritization module locates a new prioritization scheme, then at operation 311, the prioritization of the requested content items is determined based on the new prioritization scheme, which can be modified in some cases to accommodate some priority preferences from the client device (e.g., from the browser). At operation 313, the prioritization module re-orders the content items and orders them into a set of responses to be sent to the client device according to the prioritization scheme determined at operation 311.

If the prioritization module does not locate a new prioritization scheme when there is no content priority information, then at operation 315, the prioritization of the requested content items is determined based primarily on priority preferences from the client device (e.g., from the browser). This client device priority can be combined or modified with any proxy server general rules-based prioritization that may be configured. At operation 313, the prioritization module re-orders the content items and orders them into a set of responses to be sent to the client device according to the combined or modified prioritization scheme determined at operation 315.

If the content does include priority information, but the prioritization module determines a new prioritization scheme is not available at operation 321, then at operation 319, the prioritization of the requested content items is determined based on the new prioritization scheme, which can be modified in some cases to accommodate some priority preferences from the client device (e.g., from the browser), and domain prioritization preferences. At operation 313, the prioritization module re-orders the content items and orders them into a set of responses to be sent to the client device according to the combined or modified prioritization scheme determined at operation 319.

If the content does include priority information, then prioritization module determines whether a new prioritization scheme is also available at operation 321. If the prioritization module locates a new prioritization scheme, then at operation 319, the prioritization of the requested content items is determined based primarily on priority preferences from the client device (e.g., from the browser) and the domain prioritization preferences. This client device and domain prioritization can be combined or modified with any proxy server general rules-based prioritization that may be configured. At operation 313, the prioritization module re-orders the content items and orders them into a set of responses to be sent to the client device according to the combined or modified prioritization scheme determined at operation 317.

The prioritization module, response inspection module, monitor code and monitor code insertion module can be configured to generate a wide range of priority schemes that can be configured by domain administrators or other entities. In some embodiments, rather than administrator configuration or rules based determination of the priority scheme, machine learning, or similar mechanisms can be utilized to determine optimal prioritization for individual pages. As discussed, the response inspection module, monitor code and monitor code insertion module can also observe the content items as they are returned from the origin server and sent to the client devices to track performance and inform the prioritization of future requests. Monitor code in the client devices can also provide feedback on the efficacy of the prioritization schemes to enable further optimization of the prioritization scheme.

The embodiments of the prioritization module, response inspection module, monitor code and monitor code insertion module improve performance and user experience in accessing network service (e.g., in HTTP/2 and QUIC) by using a prioritization strategy driven by the proxy server, rather than the current approach of using a prioritization based on browser assumptions. Proxy (e.g., edge device) driven prioritization can follow a standard provider defined structure by default or can be fine-tuned by customers for their individual network resources (e.g., web pages and content items).

The operations of the prioritization module, response inspection module, monitor code and monitor code insertion module in developing a new prioritization scheme can support site-specific (i.e., domain specific) logic. Customers or administrators can determine priority ordering independent of browser support and without relying on additional technology such as priority hints to be implemented by network resource request technologies. In some embodiments, advanced features can be built on top of the custom priority support provided by the prioritization module, response inspection module, monitor code and monitor code insertion module including learning the optimal priority for individual pages and changing priority mid-stream for progressive images (allowing for server-side image streaming).

The prioritization module, response inspection module, monitor code and monitor code insertion module can support modifying the prioritization of a given request including enabling the re-ordering of requests, specifying concurrency of download for requests (e.g., exclusive, shared sequential or shared concurrent), and providing a mechanism to dynamically change the priority of an in-flight response at various byte offsets in the file (e.g., progressive image delivery).

Figure 4:
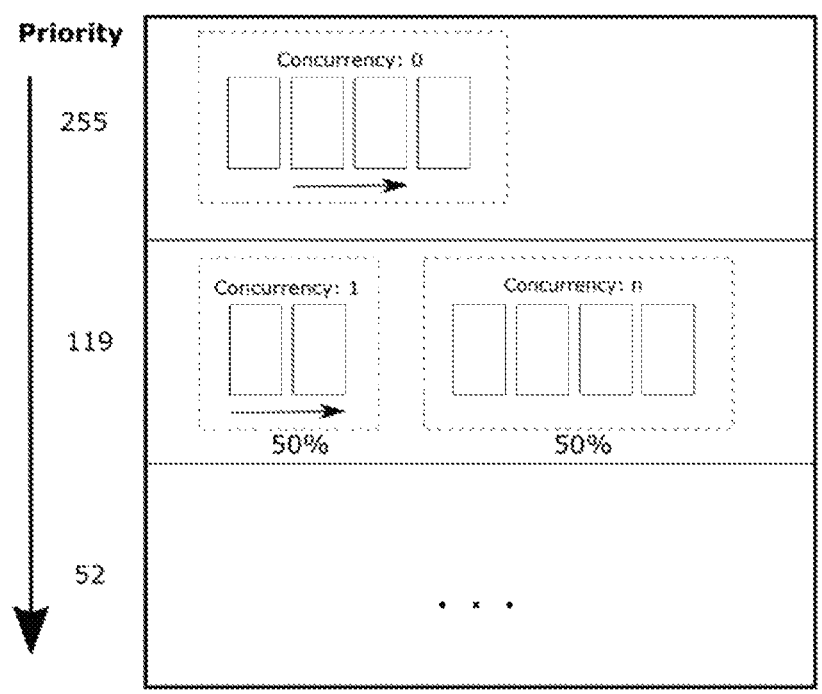
FIG. 4 is a block diagram illustrating an example prioritization scheme of the prioritization module.

FIG. 4 is a diagram illustrating a first example prioritization scheme. In the illustrated example, a priority scheme can be provided to the prioritization module where the sequencing of content items in responses can be handled by classifying each content item request with a priority level from 0-255 (e.g., with 255 being highest priority). Requests at a higher priority are delivered before requests at a lower priority (with no concurrency crossing priority boundaries). In the illustrated example, responses have priority 255 and 119. Requests at the same priority level are delivered in the order they are requested the stream identifier can be increased in order of the requests, delivering them in order of stream identifier). Strictly using priority levels would not allow for controlling the concurrency of requests so the prioritization scheme can also include another parameter for the priority of each request (e.g., concurrency (0, 1 or n)). Requests with a concurrency of 0 are delivered first at a given priority level and without sharing bandwidth with any other requests. This is optimal for things like blocking scripts and CSS.

In this first example prioritization scheme, requests with a concurrency of 1 are grouped together and delivered sequentially within the group. The group as a whole splits bandwidth evenly with the requests with concurrency n (i.e., 50% to the one resource at a time in the concurrency 1 group and 50% to the n-concurrency group). This is optimal for things like async or deferred scripts where it is desirable for user experience to load them quickly but not exclusively and where they are optimally delivered completely and in order. Requests with a concurrency n are grouped together in a single group (regardless of each request's concurrency).

In one embodiment, the bandwidth is split evenly across all requests in the group. Bandwidth splitting is done at a frame-by-frame level where the next frame to be sent is evaluated as every frame of data is being prepared to be sent (assuming the data streams are chunked in a configurable frame size for processing). In one embodiment, the prioritization scheme (1) only considers responses where data is available to be sent, (2) selects from the responses with the highest priority level, (3) where "concurrency 0" responses are available, the process fills the frame with the "concurrency 0" response that was requested earliest (i.e., the lowest stream identifier for HTTP/2), (4) otherwise, the process can utilize a round robin between the "concurrency 1" and "concurrency n" groups, picking one frame from each group. Within the "Concurrency 1" group (5), the process fills the frame with the response that was requested earliest (i.e., the lowest stream identifier for HTTP/2). Within the "concurrency n" group (6), the process utilizes a round robin across all of the available responses.

The first example prioritization scheme assumes that the priority information will be available at the start of a response (i.e., in a response header) so dynamically adjusting the priority mid-response can be managed in a way that it can be done automatically. This can be achieved by providing a list of byte offsets and new priority levels. As each frame is sent the byte offset is checked and if it crossed a specified threshold the priority of the request will be changed to the new priority level. In other embodiments the concurrency could also be adjusted for completeness. The main use case for this embodiment is progressive image delivery where the initial scans of an image are delivered first and then the priority for the final scans are delivered after other images have completed.

Figure 5:
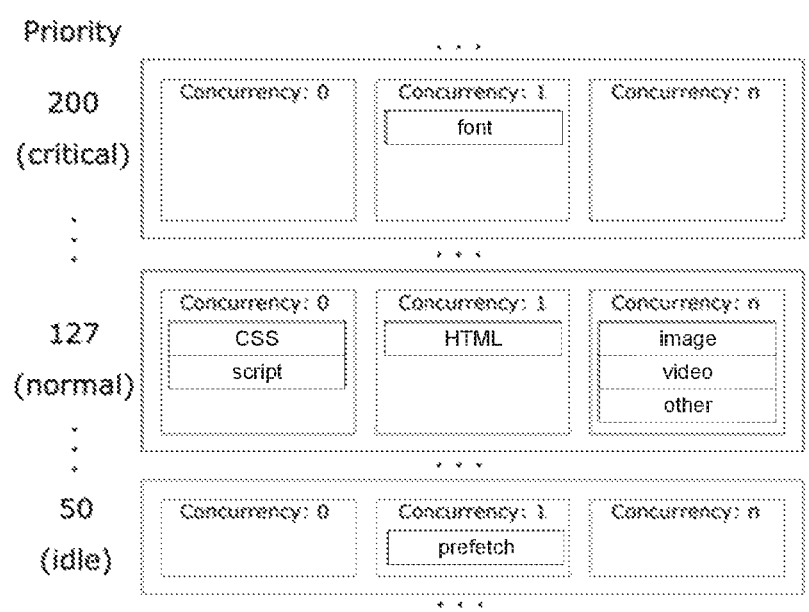
FIG. 5 is a block diagram illustrating another example prioritization scheme of the prioritization module.

FIG. 5 is a diagram of a second example prioritization scheme according to one embodiment. In this example prioritization scheme, a request header for inbound requests is added with the current HTTP/2 or QUIC information (weight, exclusive). For cases where the parent stream is a placeholder stream for grouping, the process also provides the parent stream identifier and weight (as a "group"). This is informational for downstream processing and can be used for identifying things like important scripts vs async scripts. For example, this information can be represented as, cf-request-priority: weight=192; exclusive=1, or cf-request-priority: weight=192; exclusive=0; group=3; group-weight=127.

The second example prioritization scheme can map the existing HTTP/2 priorities to the new priorities using a "default prioritization." The second example prioritization scheme can add support for a response header to specify the priority level and concurrency separated by a slash (e.g., cf-priority: 255/0, cf-priority: 119/1, cf-priority: 119/n). The second example prioritization scheme can add support for a separate response header that specifies priority changes at specific byte offsets. The priority changes can be a comma-separated list in the format <bytes>:<priority>/<concurrency>. For example, cf-priority-change: 10240:52/n, 20480:24:1.

The second example prioritization scheme includes a default prioritization. Mixing and matching the existing HTTP/2 prioritization with the second example prioritization scheme can lead to issues with mixing responses from both prioritization schemes. The performance and consistency can be optimized with clear default priorities such that customers and developers can prioritize their explicit responses accordingly.

The proxy server can maintain a basic mapping of mime type to priority/concurrency if explicit prioritization isn't provided through response headers. For example, FIG. 5 illustrates an example of prioritization defaults for the Chrome browser.

Figure 6:
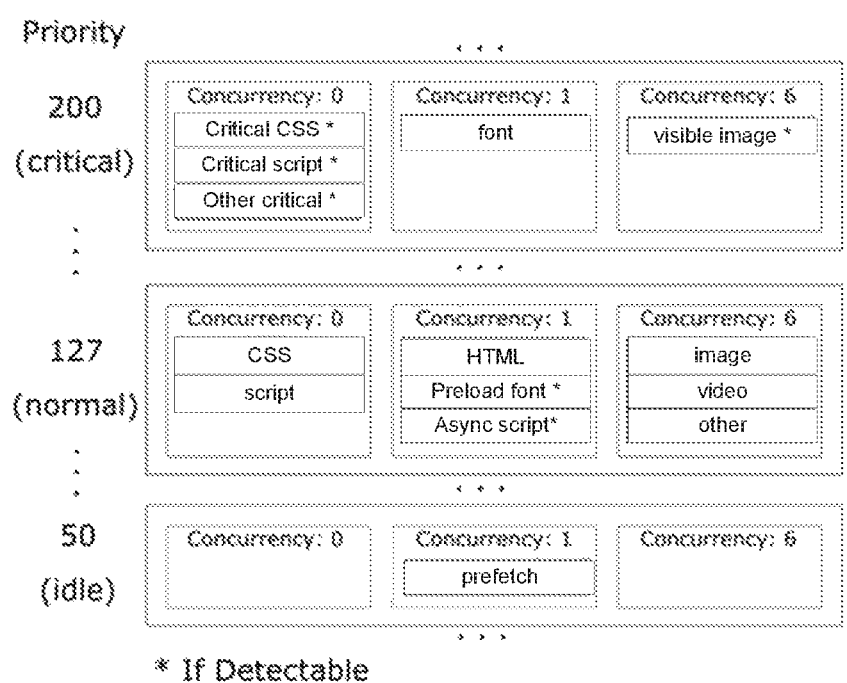
FIG. 6 is a block diagram illustrating another example prioritization scheme of the prioritization module.

The proxy server can also support a logic layer that provides additional defaults using browser-specific heuristics (e.g., in a program that processes all requests). The basic mappings can be the same, but the logic can also include prioritization tweaks for visible images, critical scripts, and similar content items using the inbound priority information from the browsers as available (e.g., the Chrome and Firefox browsers). FIG. 6 illustrates the more detailed mapping supported by the logic layer.

The prioritization will be affected by the prioritization module when the response headers are available, so the content type can be detected (if specified) and the requested HTTP/2 prioritization information can be leveraged. By default, the responses can be prioritized based on content type. In some cases, for well-known browser engines that provide content-specific weights the priorities can be adjusted. For example, the Chrome browser sets the exclusive bit and assigns the weight based on the internal priority, the Safari browser maps the internal priorities to weights, and the Firefox browser uses the phantom leader/follower groupings.

Figure 7:
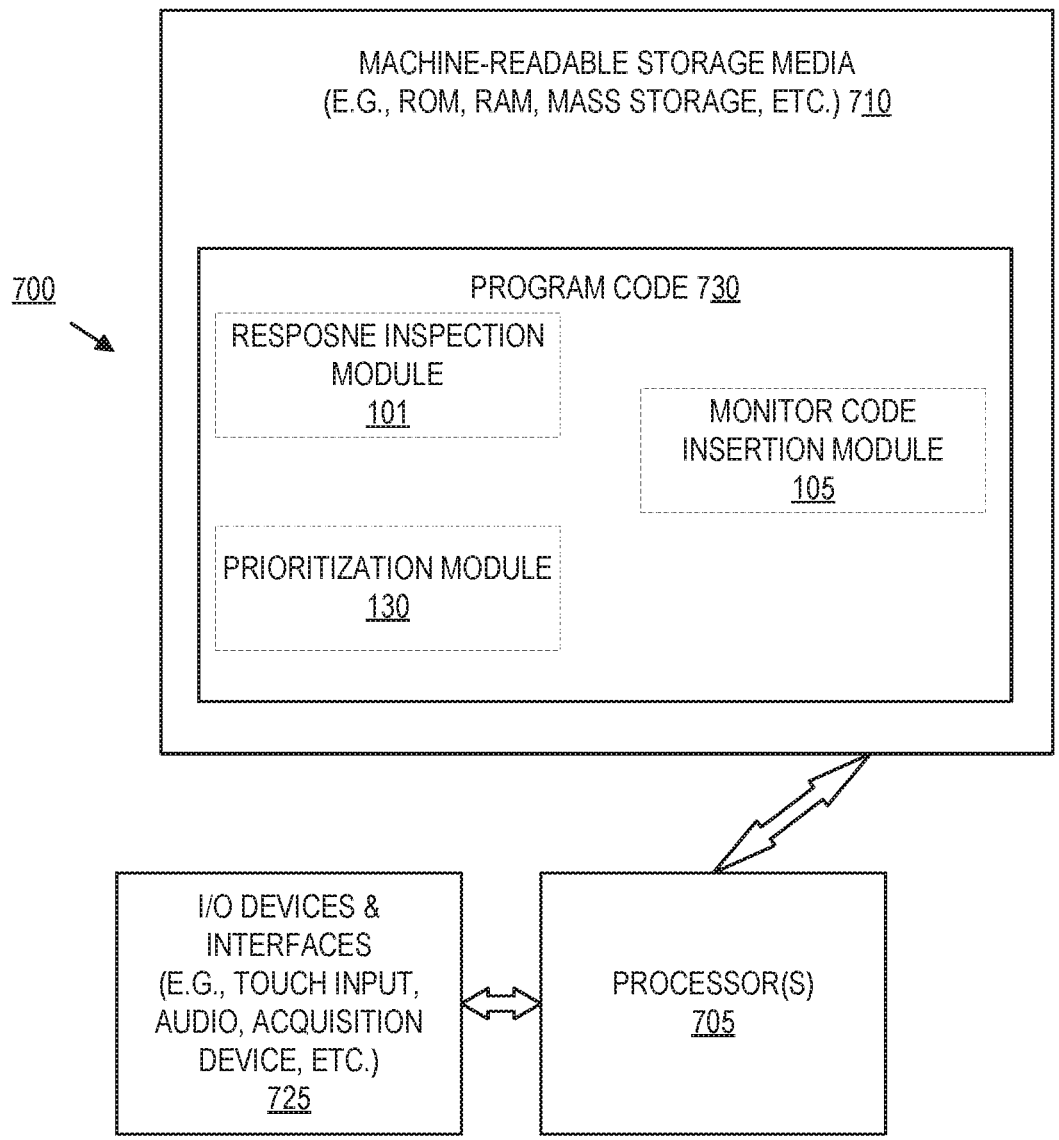
FIG. 7 is a block diagram of one example of the proxy server architecture in which the prioritization module is executed according to one embodiment.

FIG. 7 illustrates a block diagram for an exemplary data processing system 700 that may be used in some embodiments. Data processing system 700 includes one or more processors 705 and connected system components (e.g., multiple connected chips). One or more such data processing systems 700 may be utilized to implement the embodiments and operations described with respect to the proxy server, or other electronic device.

The data processing system 700 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 710 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 705. For example, the depicted machine-readable storage media 710 may store program code 730 that, when executed by the processor(s) 705, causes the data processing system 700 to execute the prioritization module 130, response inspection module 101, and monitor code insertion module 105.

The data processing system 700 also includes one or more input or output ("I/O") devices and interfaces 725, which are provided to allow a user to provide input to, receive output from, and otherwise transfer data to and from the system. These I/O devices 725 may include a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. The I/O devices and interfaces 725 may include wireless transceivers, such as an IEEE 802.11 transceiver, an infrared transceiver, a Bluetooth transceiver, a wireless cellular telephony transceiver (e.g., 2G, 3G, 7G, 5G), an NFC transceiver, or another wireless protocol to connect the data processing system 700 with another device, external component, or a network and receive stored instructions, data, tokens, etc. For instance, a wired or wireless transceiver may transmit and receive messages to and from the proxy server as described herein.

Additional components, not shown, may also be part of the system 700, and, in certain embodiments, fewer components than that shown in FIG. 7 may also be used in a data processing system 700. One or more buses may be used to interconnect the various components shown in FIG. 7.

Thus, an electronic device (e.g., a proxy server) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client device, proxy server, origin server, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   receiving, at a proxy server, a request for a plurality of content items from a client device, where the proxy server is in a distributed cloud computing platform;
   receiving a first content item of the plurality of content items from an origin server or a cache;
   determining a priority scheme for ordering the plurality of content items, where the priority scheme is specific to the plurality of content items and is derived from analysis of the first content item from the plurality of content items, where the priority scheme is determined based on a combination of explicit priority information in the first content item, location of references to other content items in the first content item, pre-defined content item specific prioritizations of at least one content item in the first content item, and whether the other content items are initially visible to a user, where a highest priority level is to be delivered without bandwidth sharing, and where a range of lower priority levels split bandwidth concurrently between content items of a same priority level in the range of lower priority levels;
   storing the priority scheme at the proxy server for application by the proxy server to subsequent requests for the first content item; and
   sending a response including the plurality of content items to the client device in an order according to the determined priority scheme.

2. The method of claim 1, further comprising:
   determining the priority scheme by scanning, at the proxy server, the first content item for references to the other content items in the plurality of content items.

3. The method of claim 2, further comprising:
   raising a priority of the other content items that are proximate to a header of the first content item.

4. The method of claim 1, further comprising:
   inserting monitor code into the first content item to be executed or interpreted by the client device.

5. The method of claim 4, further comprising:
   receiving feedback from the monitor code including explicit priority information, reference location priority information, or content item visibility information.

6. The method of claim 1, wherein the plurality of content items includes any one of a web page, an image, an audio file, a web application, or a script.

7. A non-transitory machine-readable storage medium that stores instructions, that when executed by a processor of a proxy server, causes said processor to perform operations comprising:
   receiving, at the proxy server, a request for a plurality of content items from a client device, where the proxy server is in a distributed cloud computing platform;
   receiving a first content item of the plurality of content items from an origin server or a cache;
   determining a priority scheme for ordering the plurality of content items, where the priority scheme is specific to the plurality of content items and is derived from analysis of a first content item from the plurality of content items, where the priority scheme is determined based on a combination of explicit priority information in the first content item, location of references to other content items in the first content item, pre-defined content item specific prioritizations of at least one content item in the first content item, and whether the other content items are initially visible to a user, where a highest priority level is to be delivered without bandwidth sharing, and where a range of lower priority levels split bandwidth concurrently between content items of a same priority level in the range of lower priority levels;
   storing the priority scheme at the proxy server for application by the proxy server to subsequent requests for the first content item; and
   sending a response including the plurality of content items to the client device in an order according to the determined priority scheme.

8. The non-transitory machine-readable storage medium of claim 7, wherein the operations further comprise:
   determining the priority scheme by scanning, at the proxy server, the first content item for references to the other content items in the plurality of content items.

9. The non-transitory machine-readable storage medium of claim 8, wherein the operations further comprise:
   raising a priority of the other content items that are proximate to a header of the first content item.

10. The non-transitory machine-readable storage medium of claim 7, wherein the operations further comprise:
    inserting monitor code into the first content item to be executed or interpreted by the client device.

11. The non-transitory machine-readable storage medium of claim 10, wherein the operations further comprise:
    receiving feedback from the monitor code including explicit priority information, reference location priority information, or content item visibility information.

12. The non-transitory machine-readable storage medium of claim 7, wherein the plurality of content items includes any one of a web page, an image, an audio file, a web application, or a script.

13. A first server, comprising:

a processor; and a non-transitory machine-readable storage medium that provides instructions that, when executed by the processor, causes the first server to perform operations including:

receive a request for a plurality of content items from a client device, where the first server is in a distributed cloud computing platform;

receive a first content item of the plurality of content items from an origin server or a cache;

determine a priority scheme for ordering the plurality of content items, where the priority scheme is specific to the plurality of content items and is derived from analysis of a first content item from the plurality of content items, where the priority scheme is determined based on a combination of explicit priority information in the first content item, location of references to other content items in the first content item, pre-defined content item specific prioritizations of at least one content item in the first content item, and whether the other content items are initially visible to a user, where a highest priority level is to be delivered without bandwidth sharing, and where a range of lower priority levels split bandwidth concurrently between content items of a same priority level in the range of lower priority levels;

storing the priority scheme at the proxy server for application by the proxy server to subsequent requests for the first content item; and send a response including the plurality of content items to the client device in an order according to the determined priority scheme.

14. The first server of claim 13, wherein the processor is further to perform operations comprising:

determining the priority scheme by scanning, at the first server, the first content item for references to the other content items in the plurality of content items.

15. The first server of claim 14, wherein the processor is further to perform operations comprising:

raising a priority of the other content items that are proximate to a header of the first content item.

16. The first server of claim 13, wherein the operations further comprise:

inserting monitor code into the first content item to be executed or interpreted by the client device.

17. The first server of claim 16, wherein the operations further comprise:

receiving feedback from the monitor code including explicit priority information, reference location priority information, or content item visibility information.

18. The first server of claim 13, wherein the plurality of content items includes any one of a web page, an image, an audio file, a web application, or a script.

* * * * *